United States Patent
Bar-Ness et al.

(10) Patent No.: US 8,040,787 B2
(45) Date of Patent: Oct. 18, 2011

(54) METHOD AND/OR SYSTEM FOR REDUCTION OF PAPR

(75) Inventors: Yeheskel Bar-Ness, Marlboro, NJ (US); Zoran Latinovic, Marlton, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1344 days.

(21) Appl. No.: 11/293,852

(22) Filed: Dec. 2, 2005

(65) Prior Publication Data

US 2006/0245346 A1 Nov. 2, 2006

Related U.S. Application Data

(60) Provisional application No. 60/632,556, filed on Dec. 2, 2004.

(51) Int. Cl.
*H04J 11/00* (2006.01)
*H04W 4/00* (2009.01)
*H04L 1/00* (2006.01)

(52) U.S. Cl. .......................... 370/203; 370/334; 375/346

(58) Field of Classification Search ........................ None
See application file for complete search history.

(56) References Cited

U.S. PATENT DOCUMENTS

| | | | |
|---|---|---|---|
| 6,445,747 B1 | 9/2002 | Jafarkhani et al. | |
| 6,614,861 B1 | 9/2003 | Terry et al. | |
| 7,339,884 B2 * | 3/2008 | Bar-Ness et al. | 370/203 |
| 7,376,202 B2 * | 5/2008 | Bar-Ness et al. | 375/296 |
| 2001/0006359 A1 * | 7/2001 | Suzuki et al. | 333/14 |
| 2003/0076777 A1 * | 4/2003 | Stuber et al. | 370/206 |
| 2003/0086363 A1 * | 5/2003 | Hernandez | 370/208 |
| 2004/0042556 A1 * | 3/2004 | Medvedev et al. | 375/260 |
| 2004/0125880 A1 | 7/2004 | Emami et al. | |
| 2004/0190640 A1 * | 9/2004 | Dubuc et al. | 375/260 |
| 2005/0041693 A1 * | 2/2005 | Priotti | 370/503 |
| 2005/0147025 A1 * | 7/2005 | Auer | 370/203 |
| 2005/0220322 A1 * | 10/2005 | Olesen et al. | 382/100 |
| 2005/0286648 A1 * | 12/2005 | Feng et al. | 375/260 |
| 2006/0252386 A1 * | 11/2006 | Boer et al. | 455/101 |
| 2006/0262714 A1 * | 11/2006 | Tarokh et al. | 370/208 |
| 2007/0060073 A1 * | 3/2007 | Boer et al. | 455/101 |
| 2007/0098109 A1 * | 5/2007 | Vadde et al. | 375/297 |
| 2007/0121939 A1 * | 5/2007 | Olesen et al. | 380/201 |
| 2007/0217546 A1 * | 9/2007 | Sandell et al. | 375/299 |
| 2008/0095121 A1 * | 4/2008 | Shattil | 370/335 |

(Continued)

FOREIGN PATENT DOCUMENTS

EP 1545033 A1 6/2005

(Continued)

OTHER PUBLICATIONS

Tan et al. "OFDM peak-to-average power ratio reduction by combined symbol rotation and inversion with limited complexity", Dec. 1-5, 2003, Global Telecommunications Conference 2003, GLOBECOM '03. IEEE, vol. 2 p. 605-610.*

(Continued)

*Primary Examiner* — Ricky Ngo
*Assistant Examiner* — Clemence Han
(74) *Attorney, Agent, or Firm* — Connolly Bove Lodge & Hutz LLP (57) ABSTRACT

Methods and/or systems for reducing peak-to-average-power ratio (PAPR) may utilize rotation among transmit channels and/or inversion of polyphase sequences of sub-blocks of an orthogonal frequency-division multiplex (OFDM) sequence in a multi-input multi-output (MIMO) scheme.

12 Claims, 5 Drawing Sheets

U.S. PATENT DOCUMENTS

| | | | | |
|---|---|---|---|---|
| 2008/0253279 | A1* | 10/2008 | Ma et al. | 370/206 |
| 2008/0260070 | A1* | 10/2008 | Ho et al. | 375/302 |
| 2009/0003466 | A1* | 1/2009 | Taherzadehboroujeni et al. | 375/260 |

FOREIGN PATENT DOCUMENTS

| | | |
|---|---|---|
| JP | 2000-517500 T | 12/2000 |
| JP | 2004-147126 A | 5/2004 |
| JP | 2004-173258 A | 6/2004 |
| JP | 2005-524278 T | 8/2005 |
| JP | 2005-537750 T | 12/2005 |
| JP | 2006-517749 T | 7/2006 |
| JP | 2006-518146 T | 8/2006 |
| JP | 2008-523713 T | 7/2008 |
| WO | WO-2006060651 | 6/2006 |

OTHER PUBLICATIONS

Tan et al. "OFDM peak power reduction by a novel coding scheme with threshold control", Oct. 7-11, 2001, Vehicular Technology Conference 2001, VTC 2001 Fall. IEEE VTS 54th, vol. 2 p. 669-672.*

Tan, M., and Bar-Ness, Y., "OFDM Peak-to-Average Power Ratio Reduction by Combined Symbol Rotation and Inversion with Limited Complexity," IEEE GLOBECOM 2003, pp. 605-610.

Office Action in Korean Counterpart Application, KR 10-2007-7015187, Nov. 28, 2008.

Notice of Reasons for Rejection issued in related JP Application No. 2007-544538 on Feb. 9, 2010.

You, Y.H. et al., "Investigating of peak-to-average power ratio in STBC-OFDM," Electronics Letters, Jun. 26, 2003, vol. 39, Issue 13, pp. 1010-1011.

Hyoung-Kyu Song et al., "PMEPR Reduction Algorithms for STBC-OFDM Signals," ICCSA 2004, LNCS 3043, Mar. 14, 2004, pp. 394-401.

Joo-Hee Moon et al., "Peak-to-average power control for multiple-antenna HIPERLAN/2 and IEEE802.11a systems," Consumer Electronics, IEEE Transactions, Nov. 2003, vol. 49, Issue 4, pp. 1078-1083.

Mizhou Tan et al., "STBC MIMO-OFDM Peak-to-Average Power Ratio Reduction by Cross-Antenna Rotation and Inversion," IEEE Communication Letters, vol. 9, No. 7, Jul. 2005.

Mizhou Tan et al., "OFDM Peak-to-Average Power Ratio Reduction by Combined Symbol Rotation and Inversion with Limited Complexity," Global Telecommunications Conference, 2003, GLOBECOME '03, IEEE, Dec. 1, 2003, vol. 2, pp. 605-610.

Tochihara et al., "A Transmission Diversity Scheme Employing Phase Hopping as Subcarriers for OFDM Transmission," Proceedings of the 2004 IEICE Communications Society Conference 1, Sep. 8, 2004, p. 438, B-5-104.

* cited by examiner

METHOD AND/OR SYSTEM FOR REDUCTION OF PAPR

RELATED APPLICATION

The current patent application claims priority to U.S. provisional patent application No. 60/632,556, filed on Dec. 2, 2004, titled "SBC MIMO-OFDM Peak-to-Average Power Ratio Reduction by Polyphase Interleaving and Inversion," assigned to the assignee of the presently claimed subject matter.

FIELD

This disclosure is related to communications.

BACKGROUND

It is desirable in communications to have the ability reduce the ratio of peak power to average power (hereinafter, PAPR) since a higher ratio may produce a greater amount of in-band and out-of-band distortion if the signal is passed through a non-linear device, such as a transmitter power amplifier.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description if read with the accompanying drawings in which:

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well known methods, procedures, components and/or circuits have not been described in detail so as not to obscure claimed subject matter.

Some portions of the detailed description which follow are presented in terms of algorithms and/or symbolic representations of operations on data bits and/or binary digital signals stored within a computing system, such as within a computer and/or computing system memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing may involve physical manipulations of physical quantities. Typically, although not necessarily, these quantities may take the form of electrical and/or magnetic signals capable of being stored, transferred, combined, compared and/or otherwise manipulated. It has proven convenient, at times, principally for reasons of common usage, to refer to these signals as bits, data, values, elements, symbols, characters, terms, numbers, numerals and/or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining" and/or the like refer to the actions and/or processes of a computing platform, such as a computer or a similar electronic computing device, that manipulates and/or transforms data represented as physical electronic and/or magnetic quantities and/or other physical quantities within the computing e's processors, memories, registers, and/or other information storage, transmission, and/or display devices.

In an embodiment in accordance with claimed subject matter, PAPR reduction is accomplished for an SFBC MIMO-OFDM system using polyphase interleaving and inversion (hereinafter, PII). Furthermore, another embodiment employing reduced complexity, termed suboptimal successive PII (hereinafter SS-PII) is also described. These schemes or embodiments provide a good compromise between performance and complexity, although claimed subject matter is not limited in scope to these two particular embodiments. Many other embodiments are possible within the scope of claimed subject matter.

Compared with the selective mapping (SLM) scheme that has been applied to STBC MIMO-OFDM and which can be adopted for SFBC-OFDM systems, these embodiments provide performance advantage, particularly under a small number of sub-blocks, although this is not a requirement, of course.

The combination of FDM modulation with multiple input multiple output (MIMO) systems may increase the system capacity and reduce receiver complexity, such as for time-variant and frequency-selective channels, for example. Therefore, MIMO-OFDM has become a promising candidate for high performance future 4G broadband wireless communications. However, as for OFDM, one disadvantage of MIMO-OFDM is that the signals transmitted on different antennas might exhibit a relatively large peak-to-average power ratio (PAPR), which may result in an undesirable amount of in-band and out-of-band distortion, such as if passed through a nonlinear device, such as a transmitter power amplifier.

Many PAPR reduction schemes for OFDM systems are proposed. Among them, signal scrambling methods are attractive since OFDM signals are modified without distortion to provide better PAPR property with a relatively low complexity. In MIMO-OFDM systems, one approach for PAPR reduction applies these schemes for OFDM systems separately on different transmit antennas. However, this is not applicable if a space-frequency block coding (SFBC) is employed in MIMO-OFDM systems, since OFDM symbols transmitted substantially simultaneously from different antennas are dependent on the used space-frequency code, as discussed in more detail later.

Considering a MIMO-OFDM system with two transmit antennas and orthogonal SFBC, for example, one embodiment is provided here in which polybase interleaving and inversion (PII) is employed. Likewise, alternate embodiments may employ more than two antennas. In this particular embodiment, however, using two antennas with this particular scheme, an OFDM sequence is partitioned into M sub-blocks of equal sizes. A sub-block is decomposed into two polyphase sequences, and these polyphase sequences may be interleaved and inverted. In this particular embodiment, polyphase interleaving and inversion may be applied to the sub-blocks independently. This may be done to find a combination that gives the highest or most PAPR reduction. For complexity reduction, in an alternate embodiment, termed here suboptimal successive PII (SS-PII), a compromise between performance and complexity may be employed. Thus, an embodiment employing SS-PII may not produce the most PAPR reduction, but sufficient PAPR reduction with a reduction in complexity over an embodiment producing the most PAPR reduction that in some particular applications, depending on a variety of factors, it may be desirable. Of course, this is simply one embodiment and claimed subject matter is not limited to this embodiment or to SFBC. For example, as described in more detail later, STBC or spatial multiplexing may alternately be employed.

Compared with the SLM scheme, these embodiments present performance advantage, particularly with small number of sub-blocks M. Although, again, claimed subject matter is not limited in scope to these particular embodiments. Many other embodiments are included within the scope of claimed subject matter. However, simulation results for these embodiments are shown for 128 sub-carriers, QPSK modulation and over-sampling factor equal to 4, as described in more detail later.

MIMO-OFDM has become a promising candidate for high performance 4G broadband wireless communications, as previously mentioned. In such systems, two basic signaling modes have been employed namely Spatial Multiplexing (SM), see, for example, Gesbert and Paulraj, "On the capacity of OFDM-based spatial multiplexing systems," IEEE Trans. Commun., vol. 50, pp 225-234, February 2002 (hereinafter [1]), which aims at increasing the data rate by spatially multiplexing independent data streams, and spatial diversity coding with either Space-Time Block Coded OFDM (STBC-OFDM) or Space-Frequency Block Coded OFDM (SFBC-OFDM), see, for example, Lee and Williams, "A space-time coded transmitter diversity technique for frequency selective fading channels," Proc. IEEE Sensory Array and Multichannel Processing Workshop, Combridge, Mass., 2000, pp 149-152; Lee and Williams, "A space-frequency transmitter diversity technique for OFDM systems," in Proc. IEEE GLOBECOM, San Francisco, Calif., 2000, pp 1473-1477, (hereinafter, [2] and [3], respectively) which exploit the spatial degrees of freedom (at the cost of rate) to improve link reliability.

As with OFDM, one disadvantage of MIMO-OFDM is that the signals transmitted on different antennas might exhibit a large peak-to-average power ratio (PAPR). However, different PAPR reduction techniques have been applied to both signaling modes and demonstrate performance advantage of CARI for different numbers of transmit antennas N.

In an OFDM modulation technique, a block of $N_c$ symbols, $\{X_n, n=0, 1, 2, \ldots, N_c-1\}$ is formed with the symbol modulating the corresponding sub-carrier from a set $\{f_n, n=0, 1, 2, \ldots, N_c-1\}$. The $N_c$ subcarriers are chosen to be orthogonal, e.g., $f_n = n\Delta f$, where $\Delta f = 1/N_c T$ and T represents the original symbol period. The resulting baseband OFDM signal $x(t)$ of a block can be expressed as (1) below"

$$x(t) = \sum_{n=0}^{N_C-1} X_n e^{j2\pi f_n t}, 0 \leq t \leq N_C T.$$

The PAPR of the transmitted signal in (1) can be defined as (2) below:

$$PAPR(x(t)) = \frac{\max_{0 \leq t \leq N_C T} |x(t)|^2}{E[|x(t)|^2]} = \frac{\max_{0 \leq t \leq N_C T} |x(t)|^2}{\frac{1}{N_C T} \int_0^{N_C T} |x(t)|^2 dt}.$$

Since most practical systems deal with discrete-time signals, instead of reducing the continuous-time peak max absolute value of x(t), the maximum amplitude of $LN_c$ samples of x(t) is reduced. Parameter L denotes the oversampling factor. The case of L=1 is known as critical sampling or Nyquist rat sampling, whereas values of L>1 correspond to oversampling. Oversampling may be implemented by adding (L−1) $N_c$ zeros to the original OFDM block followed by the Inverse Fast Fourier Transform (IFFT). The complementary cumulative distribution function (CCDF) of the PAPR of an OFDM signal for a given PAPR level, $PAPR_0$, is the probability that the PAPR of a randomly generated OFDM symbol, composed of $N_c$ sub-carriers, exceeds the given threshold PAPR, e.g., this is expressed below as (3):

$CCDF=Pr(PAPR>PAPR_0)$.

For this embodiment, we may assume OFDM symbols with the number of carriers $N_c$=128, $X_n$ is an element of $\{+1, -1, +j, -j\}$ or QPSK modulation and the oversampling factor L=4 since it is sufficient for capturing the continuous-time peaks, see, for example, Tellambura, "Computation of the continuous-time PAR of an OFDM signal with BPSK subcarriers," IEEE Commun. Lett. Vol. 5, pp. 185-187, May 2001.

Figure 1:
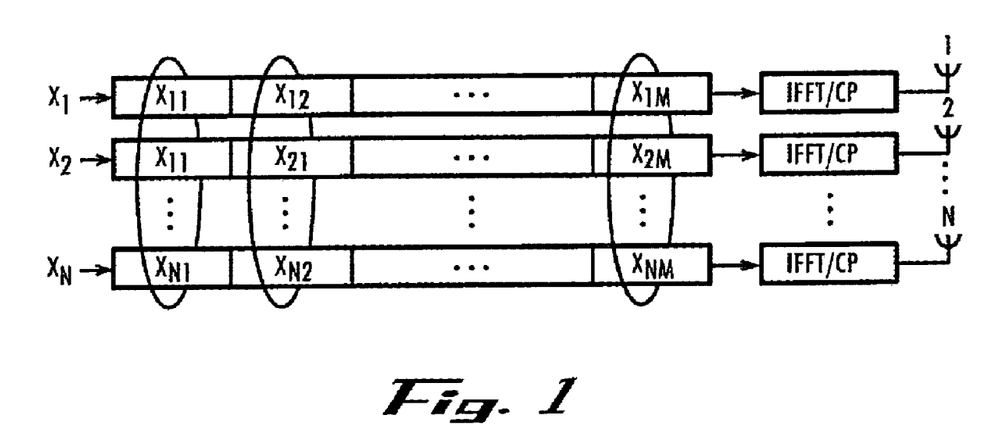
FIG. 1 is a schematic diagram illustrating an embodiment of a cross-antenna rotation and inversion scheme.

Consider a spatial multiplexing mode where N independent data streams have been fed to IFFT/Cyclic Prefix (IFFT/CP) blocks and transmitted over N antennas. A way of reducing PAPR would be applying techniques such as PTS or SLM on each antenna separately. This kind of implementation, however, does not utilize all available degrees of freedom of having multiple transmit antennas. In one embodiment in accordance with claimed subject matter, a cross-antenna rotation and inversion (CARI) scheme, such as depicted in FIG. 1, for example, may be employed, which exploits such degrees of freedom, although, of course, claimed subject matter is not limited in scope in this respect.

A data vector (sequence) $X_i$, i=1, 2, ..., N is first partitioned into M disjoint carrier sub-blocks in such a way that all sub-carrier positions in $X_{i,m}$ are set to zero if they belong to other sub-blocks $X_{i,j}, \forall j \neq m$. This may be represented as, $X_i = \sum_{m=1}^{M} X_{i,m}$ where indexes i and m denote antenna number and sub-block number, respectively. Now, consider rotation factors $r_m \in \{0, 1, 2, \ldots N-1\}$ for group of sub-blocks $X_{i,m}$, i=1, 2, ... N as well as weighting factors $b_m \in W=\{e^{2\pi k/w}, k=0, 1, \ldots, w-1\}$ where w denotes the cardinal number of set W. To reduce complexity in discussing this approach, a scheme in which w=2 is considered, e.g., set $W=\{+1, -1\}$. Nonetheless, claimed subject matter is not limited in scope in this respect. Many other schemes are included within the scope of claimed subject matter. However, for this particular embodiment, sub-blocks of $m^{th}$ group are circularly shifted in a vertical direction for $r_m$ positions and then multiplied by factor $b_m$. Such operations produce interleaving and inverting of the OFDM sequence; however, this is merely one example.

Interleaving and inverting of sub-blocks as used in this specification is much more general than this particular example. Nonetheless, for example, for this particular embodiment, after one circular shift ($r_1=1$) and multiplication by $b_1$ is applied to the first sub-blocks $X_{1,1}$, while other sub-blocks remain unchanged, we obtain a new sequence set as expressed in (4) below:

$$X'_1 = b_1 X_{N,1} + \sum_{m=2}^{M} X_{1,m},$$

$$X'_2 = b_1 X_{1,1} + \sum_{m=2}^{M} X_{2,m},$$

$$\vdots$$

$$X'_N = b_1 X_{N-1,1} + \sum_{m=2}^{M} X_{N,m}.$$

When factors of $r_m$ and $b_m$ (hereinafter, factors r and b) take valid arbitrary values, the resultant sequence set in frequency and corresponding time domain may be expressed as follows by (5) and (6) below, respectively:

$$X'_i = \sum_{m=1}^{M} b_m X_{mod(i-r_m-1,N)+1,m}, \ i = 1, 2, \ldots, N$$

$$x'_i = \sum_{m=1}^{M} b_m x_{mod(i-r_m-1,N)+1,m}, \ i = 1, 2, \ldots, N$$

where $x_i'$ is the IFFT of $X_i'$ and mod(a,b) denotes modulus of a to base b. A sequence set denoted as $\{X_1, X_2, \ldots X_N\}$ will have the smallest maximum PAPR among all other sequence sets $\{X'_1, X'_2, \ldots X'_N\}$. In other words, for a certain sequence set, e.g., certain r and b factors, the maximum PAPR in the set, here, the maximum PAPR among the antennas, may be found. Likewise, going through all possible combinations of factors r and b, a sequence set that has the smallest maximum PAPR may be found, referred to here as a mini-max criterion. The parameters for a given original set of sequences may be expressed by (7) below:

$$\{\bar{r}_1, \bar{r}_2, \ldots, \bar{r}_M, \bar{b}_1, \bar{b}_2, \ldots, \bar{b}_M\} =$$

$$\arg \min_{\{r_1, r_2, \ldots, r_M, b_1, b_2, \ldots, b_M\}} \left( \max_{i=1,2,\ldots,N} (PAPR(x'_i)) \right),$$

where $x'_i$ is defined in (6) and PAPR(x) denotes the peak-to-advantage ratio of time vector x defined in (2). This particular embodiment, therefore, reduces to the PTS scheme described in [1] for the case of N=1 and expanded set W={+1, −1, +j, −j}. As in the case of a PTS technique, this particular embodiment utilizes an advantage of calculating IFFT for sub-blocks individually and improving PAPR in the time domain by (6). Additionally, certain side information bits may be transmitted to the receiver to undo data scrambling. However, for this embodiment, complexity may be large due to the number of trials to determine the appropriate factors to reduce PAPR.

For the SLM approach, described in [2], V statistically independent sequences are produced by multiplying the original information sequence by V different $N_c$-long random sequences with values chosen from the set W={−1, +1, −j, +j}. One sequence out of V with the lowest PAPR is chosen for transmission. In the case of N transmit antennas, one can chose to perform PAPR reduction on each antenna separately, e.g., to generate N sets of V independent sequences and transmit one with the smallest PAPR from each set. However, overhead bits may be sent to the receiver notifying which one out of V random sequences is used for each antenna for data scrambling. It is assumed that the receiver has the knowledge of all V random sequences.

In the PTS approach, as described in [1], the input data block X is partitioned into M disjoint sub-blocks of equal size m={1, 2, . . . M}, which can be represented mathematically as $X = \sum_{m=1}^{M} X_m$. These sub-blocks are combined in such a way that the resultant sequence $X' = \sum_{m=1}^{M} b_m X_m$ achieves the smallest possible PAPR, where weighing factors $b_m \in \{+1, -1, +j, -j\}$. Unlike SLM, the performance of PTS scheme is sensitive to w, e.g., the size of W. Using the linearity of IFFT, improvement is also performed in the time domain $x' = \sum_{m=1}^{M} b_m x_m$ where partial transmit sequence $x_m$ is the IFFT of $X_m$.

In contrast to PTS and SLM schemes which treat antennas independently, this particular embodiment handles them jointly, although, again, claimed subject matter is not limited in scope to this particular embodiment. It has been shown in [1], for example, that PTS gives advantage over SLM for similar complexity, e.g., the same number of IFFT operations M=V. Table 1 gives an overview of considered schemes with respect to complexity, here, the number of IFFT operations, the number of trials and the number of side information bits.

TABLE I

SCHEME OVERVIEW

| Scheme | No. of IFFTs | No. of Trials | No. of Side Information bits[a] |
|---|---|---|---|
| PTS | NM | $Nw^{M-1}$ | $\lceil N(M-1)\log_2(w) \rceil$ |
| SLM | NV | — | $\lceil N \log_2(V) \rceil$ |
| Concurrent SLM | NV | — | $\lceil \log_2(V) \rceil$ |
| CARI | NM | $(Nw)^{M-1}$ | $\lceil (M-1)\log_2(Nw) \rceil$ |
| Successive PTS | NM | NMw | $\lceil N M \log_2(w) \rceil$ |
| SS-CARI | NM | NMw | $\lceil M \log_2(Nw) \rceil$ |
| MCARI | NM | $(Nw)^M$ | $\lceil M \log_2(Nw) \rceil$ |
| SS-MCARI | NM | NMw | $\lceil M \log_2(Nw) \rceil$ |

[a]The operation [x] rounds x upwards to the nearest integer.

Figure 2:
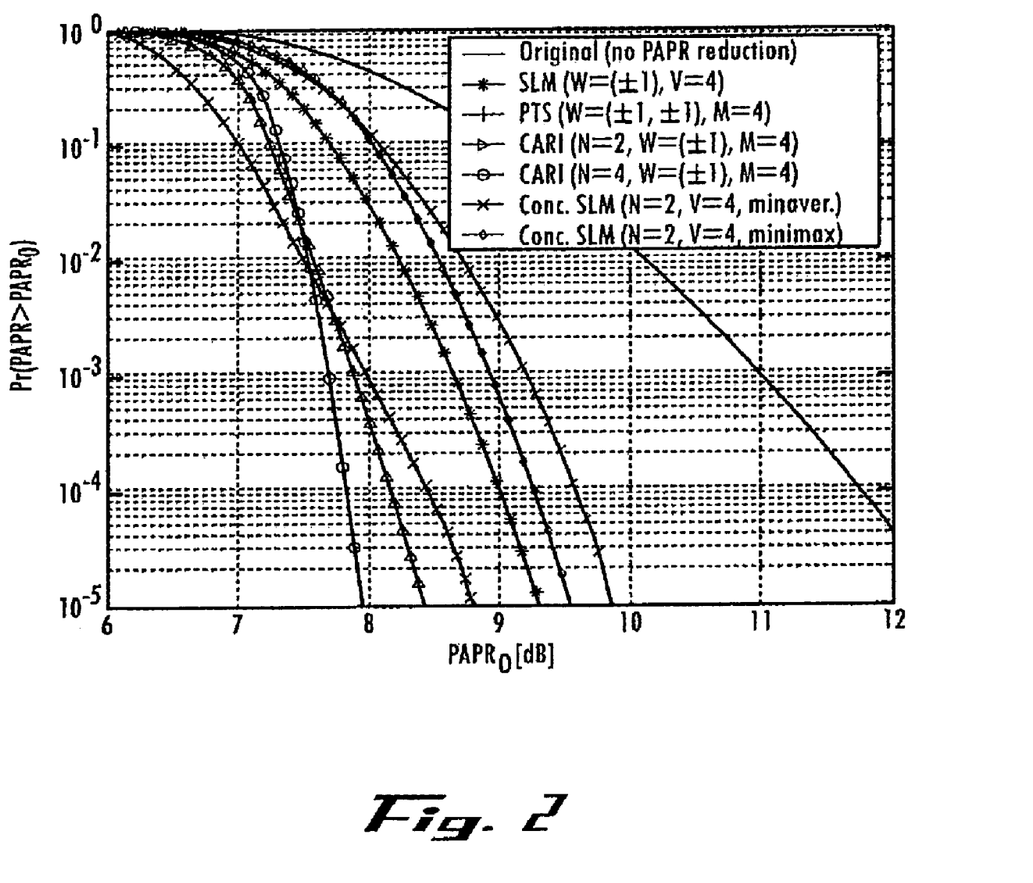
FIG. 2 is a plot comparing performance of different embodiment schemes employed to reduce PAPR.

FIG. 2 shows the PAPR performance of this particular embodiment, versus PTS and SLM schemes for number of sub-blocks (random sequences) M=V=4, the number of antennas $N \in \{2, 4\}$ and using $10^5$ independent OFDM symbols. It can be seen from the plot that this particular embodiment performs better than PTS. Furthermore, the slope is steeper if the number of antennas increases, resulting in a potential reduction of high PAPR values. Also note from FIG. 2 that, for N=2, for this embodiment, better PAPR reduction takes place if compared to PTS even though the former employs half the number of trials and side information bits, as illustrated in Table 1, for example. For the case of N=4, however, this particular embodiment employs twice as many number of trails compared to PTS, employs 9 side information bits, instead of 24, and gives good PAPR reduction and a steep slope. Another implementation advantage for this particular embodiment is that weighting factors are drawn from the set W={+1, −1} and not from the set W={+1, −1, +j, −j}, as in the case of PTS. Thus, these results imply that this particular embodiment reduces the PAPR of MIMO-OFDM more than SLM for the same number of IFFTs.

For this particular embodiment, some advantage may be associated at least in part with employing rotation and inversion on the independent OFDM sub-blocks transmitted on different antennas. For example, this approach produces higher degrees of freedom that may offset the possibility of encountering poor sequences with high PAPR, although, of course, claimed subject matter is not limited in scope in this respect. However, in order to find the desired sequence set the number of trials may be relatively large for N>2 and/or M>4.

Thus, an alternate embodiment within the scope of claimed subject matter, for example, with reduced complexity, may be employed. This may, for these purposes, be referred to as a successive suboptimal CARI (SS-CARI) scheme. Instead of searching through all possible combinations of factors r and b, the search may be performed in successive fashion, although, again, claimed subject matter is not limited in scope in this respect. Many other embodiments are possible within the scope of claimed subject matter.

However, for this particular embodiment, first, assume that $r_m=0$ and $b_m=1$ for m (the original set of sequences), compute the PAPRs of the whole set of sequences (6) and store the maximum value in memory. Then, search through the possible combinations of $r_1$ and $b_1$, keeping coefficients for other sub-blocks unchanged. For each combination, find the maximum PAPR among the antennas. If it is less than the one stored in the memory, overwrite it with the new value, and keep corresponding $r_1$ and $b_1$. After all possible combinations are exhausted, we will obtain the best $r_1$ and $b_1$ factors. Then, the process continues in this fashion, changing one sub-block at the time, until all r and b factors have been found successively. Again, this is simply one approach and many other are possible and included within the scope of claimed subject matter.

Figure 3:
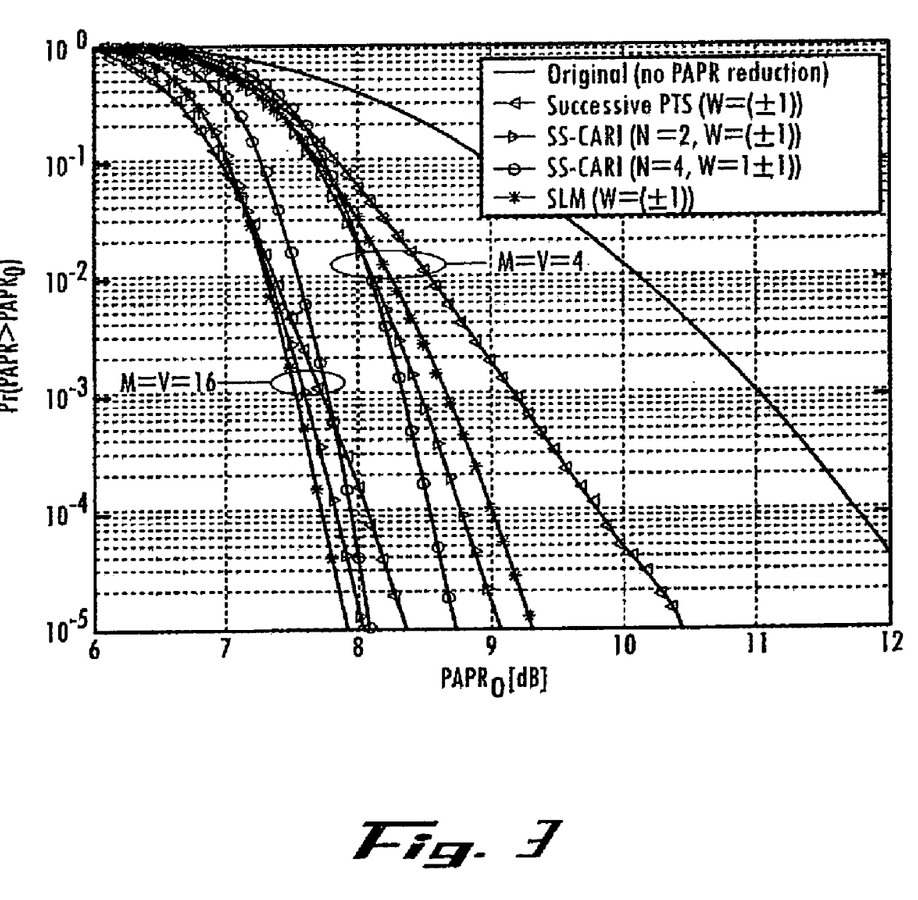
FIG. 3 is a plot comparing performance of different embodiment schemes for different values of antennas and sub-blocks.

FIG. 3 shows the PAPR performance of this embodiment for different number of transmit antennas N and sub-blocks M in comparison to SLM employing $10^6$ independent OFDM symbols, for example. In the case of M=V=4 and N=2, this embodiment gives some gain compared to SLM. In the case of M=V=16, performance differences are smaller. As with SLM, this embodiment employs the same number of $N_c$-point IFFTs, but if the transforms may be used to exploit the fact that the large number of the input vectors contain zeros, an additional reduction in complexity may be achieved by employing this particular embodiment.

Figure 4:
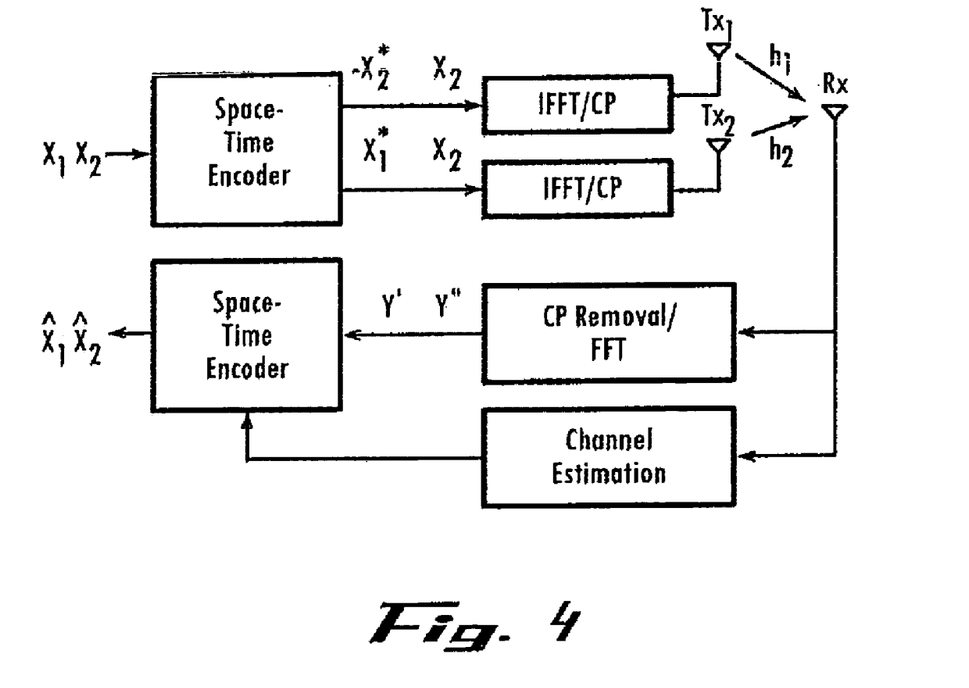
FIG. 4 is a schematic diagram illustrating an embodiment of an STBC-OFDM scheme.

Whereas previously we considered an embodiment involving spatial multiplexing, likewise, embodiments for STBC coding and SFBC coding are possible and included within the scope of claimed subject matter. To illustrate operation, but for simplicity, let us consider a STBC-OFDM system that employs an Alamouti scheme, see, for example, Alamout, "A simple transmit diversity technique for wireless communications," IEEE J. Select Areas Commun., vol. 16, pp. 1451-1458, October, 1998 (hereinafter, [4]), as depicted in FIG. 4. Of course, this is merely an example and claimed subject matter is not limited in scope to this particular example. During the first symbol period, two independent OFDM symbols $X_1$ and $X_2$ are transmitted from antennas $T_{x1}$ and $T_{x2}$, respectively. During the next symbol period $-X_2^*$ is transmitted from antenna $T_{x1}$, and $X_1^*$ is transmitted from antenna $T_{x2}$, where ( )* denotes the element-wise complex conjugate operation. In this example, we assume that the channel remains fixed for at least two OFDM symbols.

It is not difficult to show that $X_i$ and $X_i^*$ above have substantially the same PAPR properties. Therefore, with orthogonal STBC, PAPR reduction may applied for the first symbol period. After performing PAPR reduction on $X_1$ and $X_2$, such as, for example, by using an embodiment in accordance with claimed subject matter, two modified sequences with good PAPR properties are obtained, which will be transmitted during the first symbol period. During the second symbol period $-X_2^*$ and $X_1^*$ may be transmitted, having substantially the same PAPR properties.

Since sequences $X_1$ and $X_2$ are independent, previously described results for the previously described embodiments are valid for this embodiment, involving an STBC-OFDM system. As an example, for a system with N=4, a ½-rate complex orthogonal STB code, see, for example, Tarokh, Jafarkhani, and Calderbank, "Space-time block codes from orthogonal designs," IEEE J. Select. Areas Commun., vol. 16, pp 1451-1458, October 1998, may be considered.

Figure 5:
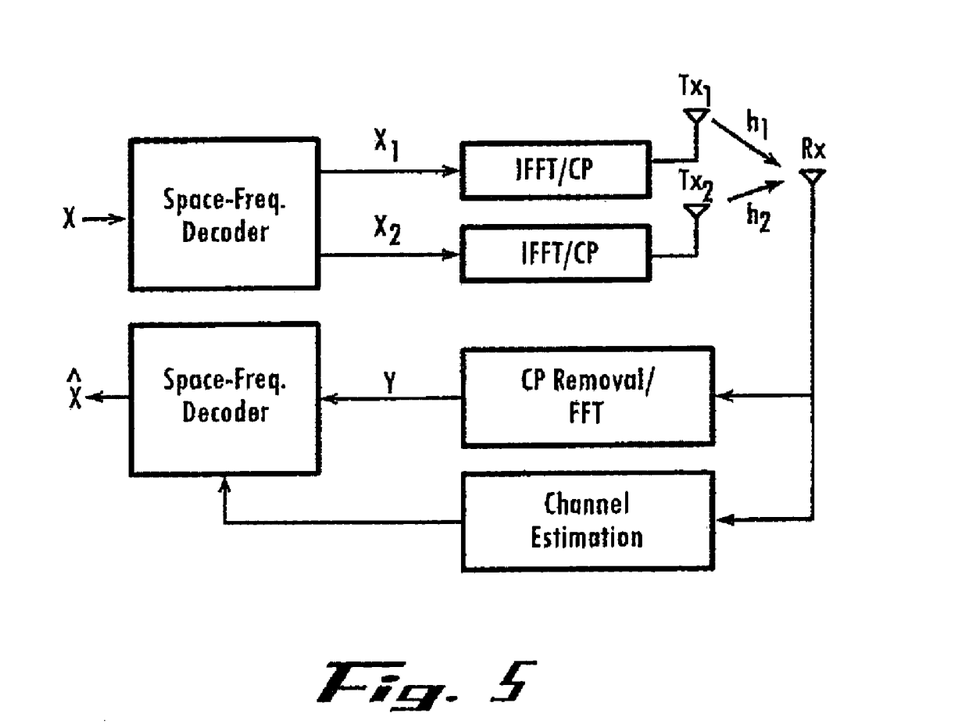
FIG. 5 is a schematic diagram illustrating an embodiment of an SFBC-OFDM scheme.

The previously described embodiments may be employed with a STBC-OFDM transmit diversity embodiment. However, such an environment may in at least some instances be impractical in mobile systems since OFDM symbol duration may be comparable to the channel coherence time. Instead, in fast fading environments, SFBC-OFDM transmit diversity technique may be applied to achieve better performance. For simplicity, in an alternate embodiment, let us consider a SFBC-OFDM system that employs an Alamouti scheme as described in [4]. A simplified block diagram of such an embodiment is shown in FIG. 5. A data symbol vector $X=[X_0, X_1, \ldots, X_{Nc-1}]$ is coded into two vectors $X_1$ and $X_2$ by the space-frequency encoder as expressed below by (8):

$$X_1 = [X_0, -X_1^*, \ldots, X_{Nc-2}, -X_{Nc-1}^*]$$

$$X_2 = [X_1, X_0^*, \ldots, X_{Nc-1}, X_{Nc-2}^*].$$

Vectors $X_1$ and $X_2$ are fed to the IFFT/CP blocks and transmitted substantially simultaneously from antennas $T_{X1}$ and $T_{X2}$, respectively. The operation of the space-frequency encoding/decoding may be elegantly expressed in terms of even $X_e$ and odd $X_o$ polyphase component vectors of the input data symbol vector X, as shown by (9) below, e.g., $$X_e = [X_0, X_2, \ldots, X_{Nc-4}, X_{Nc-2}]$$

$$X_o = [X_1, X_3, \ldots, X_{Nc-3}, X_{Nc-1}],$$

where the length of vectors $X_e$ and $X_o$ is $N_c/2$. Equation (8) may be expressed in terms of even and odd component vectors (9) as shown below in (10):

$$X_{1,e} = X_e, X_{1,o} = -X_o^*$$

$$X_{2,e} = X_o, X_{2,o} = X_e^*.$$

The demodulated signal at the receiver is given by below by (11):

$$Y = \Lambda_1 X_1 + \Lambda_2 X_2 + Z_1$$

where $\Lambda_1$ and $\Lambda_2$ represent diagonal matrices whose elements are the FFTs of the corresponding channel impulse responses $h_1$ and $h_2$. Equation (11) may be expressed in terms of even an odd vector components $X_{1,e}, X_{1,o}, X_{2,e}$ and $X_{2,o}$, as shown below by (12):

$$Y_e = \Lambda_{1,e} X_{1,e} + \Lambda_{2,e} X_{2,e} + Z_e$$

$$Y_o = \Lambda_{1,o} X_{1,o} + \Lambda_{2,o} X_{2,o} + Z_o.$$

The space-frequency decoder gives an estimation according to the following metrics expressed below by (13):

$$\hat{X}_e = \Lambda_{1,e}^* Y_e + \Lambda_{2,o} Y_o^*$$

$$\hat{X}_o = \Lambda_{2,e}^* Y_e - \Lambda_{1,o} Y_o^*.$$

Substituting (12) into (13) and assuming that the complex channel gains between adjacent sub-carriers are approximately equal, results with (14) below:

$$\hat{X}_e = (|\Lambda_{1,e}|^2 + |\Lambda_{2,e}|^2)X_e + \Lambda_{1,e}^* Z_e + \Lambda_{2,o} Z_o^*$$

$$\hat{X}_o = (|\Lambda_{1,o}|^2 + |\Lambda_{2,o}|^2)X_o + \Lambda_{2,e}^* Z_e - \Lambda_{1,o} Z_o^*.$$

A SFBC-OFDM scheme, as with an STBC-OFDM scheme, for example, also suffers from large PAPR. In this latter case, however, simple cross-antenna rotation cannot be performed since it would destroy the structure of Alamouti space-frequency block code. Thus, in an alternate embodiment, a modified scheme may be applied.

As was mentioned earlier, previous embodiments described for CARI and SS-CARI scheme cannot be applied directly to the sequences $X_1$ and $X_2$ of (8) since they are not independent, as in STBC-OFDM, even though, some implementation complexity reduction in IFFT calculations is possible due to that dependency. Instead of CARI (SS-CARI), however, for such an embodiment, the vector X may be decomposed into sequences X' and X" such that, as shown by (15) below:

$$X'_e = X_e, \; X'_o = 0_{1 \times N_c/2}$$

$$X''_e = X_o, \; X''_o = 0_{1 \times N_c/2},$$

where vectors $X_e$ and $X_o$ are defined by (9). By using linearity and basic properties of IFFT, as well as referring to (8), the time domain sequences on an antenna may be expressed in terms of x' an x", the IFFTs of X' and X", as shown by (16) below:

$$x_1^{(0)} = x' - x''^* JD$$

$$x_2^{(0)} = x''^* JD + x'',$$

where superscript $^{(0)}$ denotes unchanged order of decoded bits $\hat{X} = [\hat{X}_0, \hat{X}_1, \ldots, \hat{X}_{N_c-1}]$ from (14), J is $N_c \times N_c$ reversal or anti-diagonal matrix and D is diagonal matrix coming from a single carrier shift, as shown by (17) below:

$$J = \begin{bmatrix} 0 & \cdots & 0 & 1 \\ \vdots & & 1 & 0 \\ 0 & \cdot^{\cdot^{\cdot}} & & \vdots \\ 1 & 0 & \cdots & 0 \end{bmatrix}$$

$$D = diag(1, e^{j2\pi/N_C}, \ldots, e^{j2\pi(N_C-1)/N_C}).$$

Now there is a possibility of exchanging even and odd components of X or equivalently sending a vector $X = [X_1, X_0, \ldots, X_{N_c-1}, X_{N_c-2}]$ instead of $X = [X_0, X_1, \ldots, X_{N_c-2}, X_{N_c-1}]$. This will affect previous equations starting from (8) including (16), with the values of x' and x" being swapped, resulting in a different set of sequences, denoted as $x_1^{(1)}$ and $x_2^{(1)}$. A set between $\{x_1^{(0)}, x_2^{(0)}\}$ and $\{x_1^{(1)}, x_2^{(1)}\}$ with the smallest maximum PAPR may chosen for transmission. In the later case, bits are decoded in different order and would therefore be rearranged at the receiver, for example.

Data symbol vector $X = [X_0, X_1, \ldots, X_{N_c-1}]$ may be further partitioned into M disjoint carrier sub-blocks $X_m$, m=1, 2, \ldots, M and the previous process may be applied to each sub-block independently. $X_m$ have the size of the original sequence $N_c$ with the sub-carrier position set to zero if they belong to some other sub-block. Also, non-zero sub-carriers in a sub-block span an integer number of space-frequency code words. Thus, the original sequence may be represented as $X = \Sigma_{m=i}^{M} X_m$. Incorporating phase factors $b_m \in \{+1, -1\}$ and rotation factors $r_m \in \{0, 1\}$ for the $m^{th}$ sub-block similar to (6), the resultant time vector becomes, as shown below by (18):

$$x'_i = \sum_{m=1}^{M} b_m x_i^{(r_m)}, \; i = 1, 2.$$

Using the mini-max criterion (7) sequence set with the smallest maximum PAPR for all possible combinations, r and b factors may be selected for transmission in this particular embodiment. However, claimed subject matter is, or course, not limited in scope in this respect.

Due to higher complexity of the MCARI scheme, as illustrated in Table 1, an alternate embodiment may be employed. Instead searching through all possible combinations of r and b, this may be done in successive fashion, as was described in connection with a previously described embodiment, for example. First, assume that $r_1 = 0$ and $b_1 = 1$ for m (the original set of sequences) and compute the PAPRs of the whole set of sequences (18) and store the maximum value in the memory. Search through all possible combinations of r and b, keeping coefficients for other sub-blocks unchanged. For each combination, find the maximum PAPR among antennas and if it is less than the one stored in the memory, overwrite it with the new value. After all possible combinations are exhausted, the desired r and b factors for this sub-block remain, in this particular embodiment. The process continues in this fashion, changing only $m^{th}$ sub-blocks at the time, until r and b factors have been found successively. Regarding complexity, the number of IFFTs for this particular embodiment are substantially the same as for previously described embodiments (see, for example, Table 1). Additional complexity may occur due to two matrix multiplication in (16). Multiplication of a vector by diagonal matrix D is element-wise multiplication of two vectors whereas multiplication of a vector by anti-diagonal matrix J involves reversing the order of the vector elements.

Alternatively, the SLM scheme may be used in conjunction with the SFBC-OFDM by multiplying data vector X with V independent random sequences, applying Alamouti coding and calculating PAPR of the set $\{x'_1, x'_2\}$ for V. Again, the set of sequences for which the maximum PAPR is smallest is selected.

Figure 6:
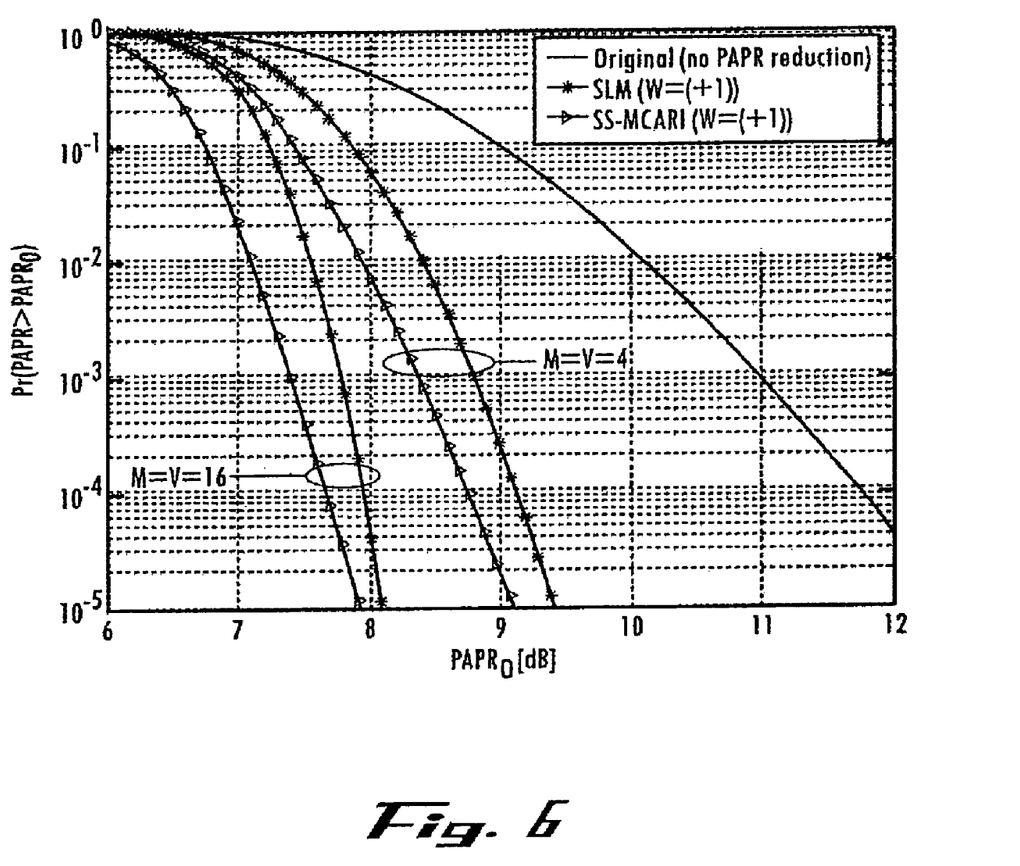
FIG. 6 is a plot comparing performance of different embodiment schemes for different values of sub-blocks.

FIG. 6 shows the performance advantage of the previously described embodiment over SLM for similar complexity, e.g., $10^6$ independent OFDM symbols and M=V $\in$ $\{4,16\}$. However, since the slope of SLM is steeper, the two curves will intersect below a $10^{-6}$ PAPR level. Nevertheless, this probability is so small that this may be neglected in practice. A drawback of this particular embodiment, however, is the higher number of side information bits compared to SLM.

In the case of N=4, as mentioned with a previous embodiment, ½-rate complex orthogonal STB code, see, for example, Tarokh, Jafarkhani, and Calderbank, "Space-time block codes from orthogonal designes," IEEE J. Select. Areas Commun., vol. 16, pp 1451-1458, October 1998, may be considered. However, to use this particular embodiment for PAPR reduction, input symbol vector $X = [X_0, X_1, \ldots, X_{N_c-1}]$ is decomposed into 4 polyphase components, for example.

It is worth noting that embodiments of claimed subject matter may be employed in a variety of contexts and claimed subject matter is not limited in scope in this respect. For example, embodiments may be employed in a variety of possible communication devices, including, for example, cell phones, personal digital assistants, laptop computers, media players, and the like. Of course, claimed subject matter is not limited in scope to this example. Many other approaches and/or other types of devices employing a variety of software, firmware and/or hardware are possible and included within the scope of claimed subject matter. It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of transmitting a signal comprising:
preparing an orthogonal frequency-division multiplex (OFDM) sequence for transmission using a multi-input multi-output (MIMO) scheme using space-frequency block coding (SFBC), including performing rotation among transmit channels, wherein said rotation among transmit channels comprises a shifting of one or more sub-blocks in the time domain, and phase rotation of polyphase sequences of at least some sub-blocks of said OFDM sequence, based on a peak-to-average-power ratio (PAPR) reduction criterion, to thus obtain a prepared OFDM sequence; and
transmitting the prepared OFDM sequence.

2. The method of claim 1, wherein the sub-blocks of the OFDM sequence having polyphase sequences that are channel-rotated and phase-rotated so that out of the possible combinations of channel-rotation and phase-rotation of polyphase sequences of sub-blocks that combination of channel-rotation and phase-rotation that reduces PAPR the most is selected for transmission.

3. The method of claim 1, wherein preparing further comprises performing rotation in time based on a further partition of at least one sub-block.

4. An apparatus comprising:
a transmitter employing a multi-input multi-output orthogonal frequency-division multiplex (MIMO-OFDM) scheme using space-frequency block coding (SFBC);
said transmitter adapted to transmit an OFDM sequence in which polyphase sequences of at least some sub-blocks of said OFDM sequence have been rotated among transmit channels, wherein said rotation among transmit channels comprises a shifting of one or more sub-blocks in the time domain, and phase-rotated according to a peak-to-average-power ratio (PAPR) reduction criterion, so as to reduce PAPR.

5. The apparatus of claim 4, wherein the transmitter is adapted to select the sub-blocks of the OFDM sequence having polyphase sequences that are channel-rotated and phase-rotated so that out of the possible combinations of channel-rotation and phase-rotation of polyphase sequences of sub-blocks that combination of channel-rotation and phase-rotation that reduces PAPR the most is selected for transmission.

6. The apparatus of claim 4, wherein the transmitter is adapted to perform rotation in time based on a further partition of at least one sub-block.

7. An apparatus comprising:
a computing device;
said computing device adapted to:
prepare an orthogonal frequency-division multiplex (OFDM) sequence for transmission using a multi-input multi-output (MIMO) scheme using space-frequency block coding (SFBC), including performing rotation among transmit channels, wherein said rotation among transmit channels comprises a shifting of one or more sub-blocks in the time domain, and phase-rotating of polyphase sequences of at least some sub-blocks of said OFDM sequence, based on a peak-to-average-power ratio (PAPR) reduction criterion, to thus obtain a prepared OFDM sequence; and transmit the prepared OFDM sequence.

8. The apparatus of claim 7, wherein said computing device is adapted to select the sub-blocks of the OFDM sequence having polyphase sequences that are channel-rotated and phase-rotated so that out of the possible combinations of channel-rotation and phase-rotation of polyphase sequences of sub-blocks that combination of channel-rotation and phase-rotation that reduces PAPR the most is selected for transmission.

9. The apparatus of claim 7, wherein said computing device is further adapted to perform rotation in time based on a further partition of at least one sub-block.

10. An article comprising a non-transitory computer-readable storage medium containing instructions that, upon execution by a system, result in operations comprising:
preparing an orthogonal frequency-division multiplex (OFDM) sequence for transmission using a multi-input multi-output (MIMO) scheme using space-frequency block coding (SFBC), including performing rotation among transmit channels, wherein said rotation among transmit channels comprises a shifting of one or more sub-blocks in the time domain, and phase rotation of polyphase sequences of at least some sub-blocks of said OFDM sequence, based on a peak-to-average-power ratio (PAPR) reduction criterion, to thus obtain a prepared OFDM sequence; and transmitting the prepared OFDM sequence.

11. The article of claim 10, wherein the sub-blocks of the OFDM sequence having polyphase sequences that are channel-rotated and phase-rotated so that out of the possible combinations of channel-rotating and phase-rotating of polyphase sequences of sub-blocks that combination of channel-rotating and phase-rotating that reduces PAPR the most is selected for transmission.

12. The article of claim 10, wherein preparing further comprises performing rotation in time based on a further partition of at least one sub-block.

* * * * *

UNITED STATES PATENT AND TRADEMARK OFFICE
CERTIFICATE OF CORRECTION

| | |
|---|---|
| PATENT NO. | : 8,040,787 B2 |
| APPLICATION NO. | : 11/293852 |
| DATED | : October 18, 2011 |
| INVENTOR(S) | : Bar-Ness et al. |

It is certified that error appears in the above-identified patent and that said Letters Patent is hereby corrected as shown below:

On Title Page 2, item (56), under "Other Publications", Line 19, delete "GLOBECOME '03," and insert -- GLOBECOM '03, --.

Column 13, line 8, in Claim 11, delete "ofpolyphase" and insert -- of polyphase --.

Signed and Sealed this
Twenty-sixth Day of June, 2012

David J. Kappos
*Director of the United States Patent and Trademark Office*